United States Patent
Yang et al.

(10) Patent No.: US 11,927,442 B2
(45) Date of Patent: Mar. 12, 2024

(54) AERIAL SURVEY METHOD AND APPARATUS CAPABLE OF ELIMINATING REDUNDANT AERIAL PHOTOS

(71) Applicant: CHENGDU RAINPOO TECHNOLOGY CO., LTD., Sichuan (CN)

(72) Inventors: Run Yang, Sichuan (CN); Cheng Li, Sichuan (CN); Hongyingtao Zhu, Sichuan (CN)

(73) Assignee: CHENGDU RAINPOO TECHNOLOGY CO., LTD., Sichuan (CN)

( * ) Notice: Subject to any disclaimer, the term of this patent is extended or adjusted under 35 U.S.C. 154(b) by 393 days.

(21) Appl. No.: 17/364,900

(22) Filed: Jul. 1, 2021

(65) Prior Publication Data

US 2021/0325182 A1 Oct. 21, 2021

Related U.S. Application Data

(63) Continuation of application No. PCT/CN2019/127290, filed on Dec. 23, 2019.

(30) Foreign Application Priority Data

Mar. 27, 2019 (CN) .......................... 201910238201.8
Jul. 25, 2019 (CN) .......................... 201910674066.1

(51) Int. Cl.
*G01C 11/02* (2006.01)
*G01C 11/04* (2006.01)
(52) U.S. Cl.
CPC .............. *G01C 11/02* (2013.01); *G01C 11/04* (2013.01)

(58) Field of Classification Search
CPC ........ G01C 11/04; G01C 11/02; G03B 37/04; G03B 15/006
See application file for complete search history.

(56) References Cited

U.S. PATENT DOCUMENTS

| 8,477,190 B2 * | 7/2013 | Giuffrida | ............... G09G 5/377 370/344 |
| 10,325,350 B2 * | 6/2019 | Schultz | ................. G06T 1/0007 |

(Continued)

FOREIGN PATENT DOCUMENTS

| CN | 103188468 | 7/2013 |
| CN | 103292790 | 9/2013 |

(Continued)

OTHER PUBLICATIONS

Zhong Wei Kong Jian Technology (Shenzhen) Co.,Ltd, "Pixel-Mosaic Aerial Image Processing system (Standalone Version)", retrieved on Sep. 3, 2019, http://www.zwpix.com/axw_view.asp?id=383, pp. 1-15.

(Continued)

*Primary Examiner* — Congvan Tran
(74) *Attorney, Agent, or Firm* — Cooper Legal Group, LLC

(57) ABSTRACT

An aerial survey method capable of eliminating redundant aerial photos includes judging whether there is an intersection between a ground projection data of aerial photos at a photographing coordinate point and a known data of a target region, and if there is an intersection between the two data, keeping aerial photography data of the photographing coordinate point or performing aerial photography at the aerial photographing point, and if there is no intersection between the two data, eliminating the aerial photography data of the photographing coordinate point or not performing aerial photography at the photographing coordinate point.

6 Claims, 4 Drawing Sheets

(56) References Cited

U.S. PATENT DOCUMENTS

| | | | | |
|---|---|---|---|---|
| 10,402,676 B2 * | 9/2019 | Wang | ............... | G06V 10/44 |
| 2009/0257620 A1 * | 10/2009 | Hicks | ............... | H04N 21/24 |
| | | | | 382/100 |
| 2010/0305782 A1 * | 12/2010 | Linden | ............... | H04N 5/772 |
| | | | | 396/419 |
| 2017/0195569 A1 * | 7/2017 | Lapstun | ............... | H04N 23/687 |
| 2019/0087283 A1 * | 3/2019 | Liu | ............... | H04N 7/185 |
| 2020/0082611 A1 * | 3/2020 | Haramaty | ............... | G06T 15/08 |

FOREIGN PATENT DOCUMENTS

| | | |
|---|---|---|
| CN | 103471567 | 12/2013 |
| CN | 106887028 | 6/2017 |
| CN | 106940181 | 7/2017 |
| CN | 107172404 | 9/2017 |
| CN | 108871288 | 11/2018 |
| CN | 110186433 | 8/2019 |
| CN | 108088422 | 12/2020 |
| KR | 101837403 | 4/2018 |
| WO | 2015199772 | 12/2015 |

OTHER PUBLICATIONS

Arko Lucieer et al., "Using an Unmanned Aerial Vehicle (UAV) to capture micro-topography of Antarctic moss beds", International Journal of Applied Earth Observation and Geoinformation, Apr. 2004, pp. 53-62.

Hong Yu et al., "Discussion on UAV Remote Sensing Image Capture and Disposal", Remote Sensing Technology And Application, Aug. 2008, submit with English abstract, pp. 462-467.

* cited by examiner

AERIAL SURVEY METHOD AND APPARATUS CAPABLE OF ELIMINATING REDUNDANT AERIAL PHOTOS

CROSS-REFERENCE TO RELATED APPLICATION

This application is a continuation of PCT application No. PCT/CN2019/127290, filed on Dec. 23, 2019, which claims a priority benefit to China patent application No. CN201910238201.8 filed on Mar. 27, 2019 and China patent application No. CN201910674066.1 filed on Jul. 25, 2019. The entirety of the above-mentioned patent applications are hereby incorporated by reference herein and made a part of this specification.

BACKGROUND

Technical Field

The present application relates to the field of aerial measurement technology, and in particular to an aerial survey method and apparatus capable of eliminating redundant aerial photos.

Description of Related Art

As disclosed in a China patent application No. 201810069841.6, for aerial photography tasks based on digital photogrammetry, an overlap ratio of images (aerial photos) is an important control parameter in the current aerial survey work or an influencing factor of aerial survey.

In the existing technologies, in order to ensure the overlap ratio of the aerial photos of a target region, the target region is expanded in a certain way to form an expanded region, and a flight route will cover the expanded region.

How to further optimize the aerial survey method so that it can serve the survey work more efficiently is a technical problem that needs to be solved urgently by those skilled in the art.

SUMMARY

As stated above, further optimization of the aerial survey method proposed above so that it can serve the survey work more efficiently is a technical problem that needs to be solved urgently by those skilled in the art. Correspondingly, the present application provides an aerial survey method and apparatus capable of eliminating redundant aerial photos. By using this method and apparatus, the amount of data processing during the aerial survey work can be effectively reduced, and thus data processing efficiency is improved.

In view of the above problem, the aerial survey method capable of eliminating redundant aerial photos provided by the present application solves the problem through the following technical points. An aerial survey method capable of eliminating redundant aerial photos includes the following steps in order:

S1, according to coordinate information and attitude information of an aircraft or an aerial camera at a photographing coordinate point, parameter information of the aerial camera and regional geographic information of a target region, obtaining ground projection data of the aerial photos at the photographing coordinate point; and S2, comparing the ground projection data obtained in S1 with known data of the target region, and if there is an intersection between the two data, obtaining the aerial photography data of the photographing coordinate point, and if there is not an intersection between the two data, eliminating the aerial photography data of the photographing coordinate point or not performing aerial photography at the photographing coordinate point.

In the existing technologies, the overlap ratio of aerial photos in the aerial survey target region is considered and addressed, however, in the aerial photography process, the aerial camera will capture a lot of aerial photo data that has nothing to do with the target region. Therefore, it not only occupies the storage capacity of the aerial camera, but also increases the burden on post-data processing, that is, not only increases the hardware cost of the aerial camera, but also increases the input cost of data processing module or apparatus, and increases the cost of data processing time, and so on.

In the present embodiment, for the specific parameters of the aircraft and of the aerial camera at the photographing coordinate point, and the regional geographic information of the target region where the photographing coordinate point is located, the relationship of the ground projection data obtained by the aerial camera at the photographing coordinate point and the known data of the target region is firstly determined, so as to choose whether to store the aerial photography data of the photographing coordinate point. In this way, useless aerial photography data can be effectively eliminated, thereby reducing the amount of useless aerial photos and achieving the purpose of reducing the amount of data storage and the amount of data processing during the aerial survey operation, and improving the efficiency of data processing.

As a person skilled in the art, when implementing the storing of the aerial photography data of the photographing coordinate point or the eliminating of the aerial photography data of the photographing coordinate point described above, the storing includes performing aerial photography at the photographing coordinate point and then storing the obtained aerial photography data; and the eliminating includes any one of the following manners: 1. when it is determined that the overlapping requirement is not met before performing aerial photography at the photographing coordinate point, aerial photography at the photographing coordinate point is not performed, that is, aerial photography is not performed at the photographing coordinate point during the entire process; and 2. when the overlapping requirement is not met after performing aerial photography at the photographing coordinate point, obtained data is deleted.

A further technical solution is as follows.

Specifically, in step S2, if it is determined that there is an intersection between the two data, aerial photography is performed at the photographing coordinate point to obtain the aerial photography data, and if it is determined that there is not an intersection, aerial photography is not performed at the photographing coordinate point. The present embodiment is to feed back the aerial camera whether to take photographs through calculation: when it is determined that the two data does not meet the overlapping requirement before performing aerial photography at the photographing coordinate point, aerial photography at the photographing coordinate point is not performed, that is, there is no aerial photography performed at the photographing coordinate point during the whole process. As a person skilled in the art, when implementing the present embodiment, the above process may be executed after the aircraft reaches the photographing coordinate point, or the determination is carried out before the aircraft reaches the photographing coordinate point. For the situation of not reaching the photographing coordinate point, since the regional geographic information of the target region is fixed, and the parameter information of the aerial camera carried is set, it is needed to prejudge the attitude information of the aircraft or the aerial camera at the photographing coordinate point, in which the prejudgment can be completed according to the parameter information of the aircraft and the weather condition information of the flight region. Based on the prejudgment, the utilization efficiency of the aircraft can be maximized. In view of this situation, the coordinate information and attitude information of the aircraft or the aerial camera at the actual photographing point may be equal to the coordinate information and attitude information of the aircraft or the aerial camera at the photographing coordinate point, since the time required to calculate the overlap is very short, and the actual photographing point is very close to the photographing coordinate point.

Specifically, when performing aerial photography at the photographing coordinate point, in step S2, if it is determined that there is an intersection between the two data, the aerial photography is kept, and if it is determined that there is not an intersection, the aerial photography data is deleted. Regarding the eliminating, the situation is that, after performing aerial photography at the photographing coordinate point, if it is determined that the two data do not meet the overlapping requirement, the obtained data is deleted. Regarding the previous situation in which the aerial photography data of the photographing coordinate point is stored, although the ground projection data calculation (overlap ratio determination) requires a very short time due to the performance of the existing processor, errors will arise in this situation, since the aircraft is in flight and the coordinate and attitude information of the aircraft when the aerial camera actually takes photographs have changed. In contrast, the manner adopted by the present embodiment can obtain more accurate aerial photography data.

The photographing coordinate point is a point in space determined by longitude, latitude and altitude data;

the attitude information includes angular velocity information and acceleration information;

the coordinate information includes longitude, latitude and altitude information;

the parameter information includes geometric parameter information and optical parameter information of the aerial camera; and the regional geographic information is altitude information of the target region or elevation data such as DEM information of the target region.

The known data of a target region is vector data such as KML data or SHP data.

In order to facilitate the quality of the aerial photography data or expand the coverage range of the aerial photography data obtained by the photographing coordinate point, the aerial camera includes a plurality of photographing modules.

The different photographing modules cover different photographing regions. This embodiment relates to a situation of expanding the coverage range of the aerial photography data obtained by the photographing coordinate point.

In order to enable individual photographing modules in the aerial camera to work independently, it is provided that, in the aerial camera, each of the photographing modules is connected with an independent control module. With this solution, the control module is used to control a corresponding photographing module whether to work or not, or/and whether to keep the obtained aerial photography data or not.

In order to provide the aircraft with a hovering function or a low-speed flight performance for taking photographs when hovering at the photographing coordinate point or taking photographs during a low-speed flight, it is provided that the aircraft is a multi-rotor type aircraft or a composite rotor type aircraft, so as to facilitate improving the accuracy of the aerial photography data and the quality of aerial photography.

Meanwhile, the present solution further provides an aerial survey apparatus capable of eliminating redundant aerial photos, including an aircraft and an aerial camera carried on the aircraft. It includes an attitude information module and a coordinate information module carried on the aircraft or the aerial camera, in which the attitude information module is configured for acquiring the attitude information of the aircraft or the aerial camera, and the coordinate information module is configured for acquiring the coordinate information of the aircraft or the aerial camera.

It further includes an aerial camera control module carried on the aircraft or the aerial camera for controlling the aerial camera. The control manner of the aerial camera control module is any one of the following manners: 1. controlling the aerial camera whether to take photographs or not; and 2. controlling the aerial camera whether to delete the taken data or not. This apparatus is used as a hardware support of the method for implementing the method, so as to achieve the purpose of reducing the amount of data to be processed in the process of aerial survey operations and improving the efficiency of data processing. For a person skilled in the art, regarding the parameter information, the existing aerial camera generally has fixed parameter information, and in specific applications, the parameter information of the aerial camera can be directly obtained.

The aerial camera control module is used to control the aerial camera whether to take photographs or not.

The aerial camera control module is used to control the aerial camera whether to delete the taken data or not.

The working parameter of the aerial camera includes geometric parameters and optical parameters.

The aerial camera includes a plurality of photographing modules.

The different photographing modules cover different photographing regions.

Each photographing module is connected with an independent control module.

The aircraft is a multi-rotor type aircraft or a composite rotor type aircraft.

The attitude information includes angular velocity information and acceleration information of the aircraft or the aerial camera, and the coordinate information includes data of longitude, latitude and altitude where the aircraft or the aerial camera is located.

The present application has the following beneficial effects.

In the present application, for specific parameters of the aircraft and of the aerial camera at the photographing coordinate point, and the regional geographic information of the target region where the photographing coordinate point is located, the relationship of the ground projection data obtained by the aerial camera at the photographing coordinate point and the known data of the target region is firstly determined, so as to choose whether to store the aerial photography data of the photographing coordinate point. In this way, useless aerial photography data can be effectively eliminated, thereby reducing the amount of useless aerial photos and achieving the purpose of reducing the amount of data storage and the amount of data processing during the aerial survey operation, and improving the efficiency of data processing.

DESCRIPTION OF THE EMBODIMENTS

The following describes the present application in further detail in conjunction with embodiments, but the present application is not limited to the following embodiments.

Embodiment 1

Figure 1:
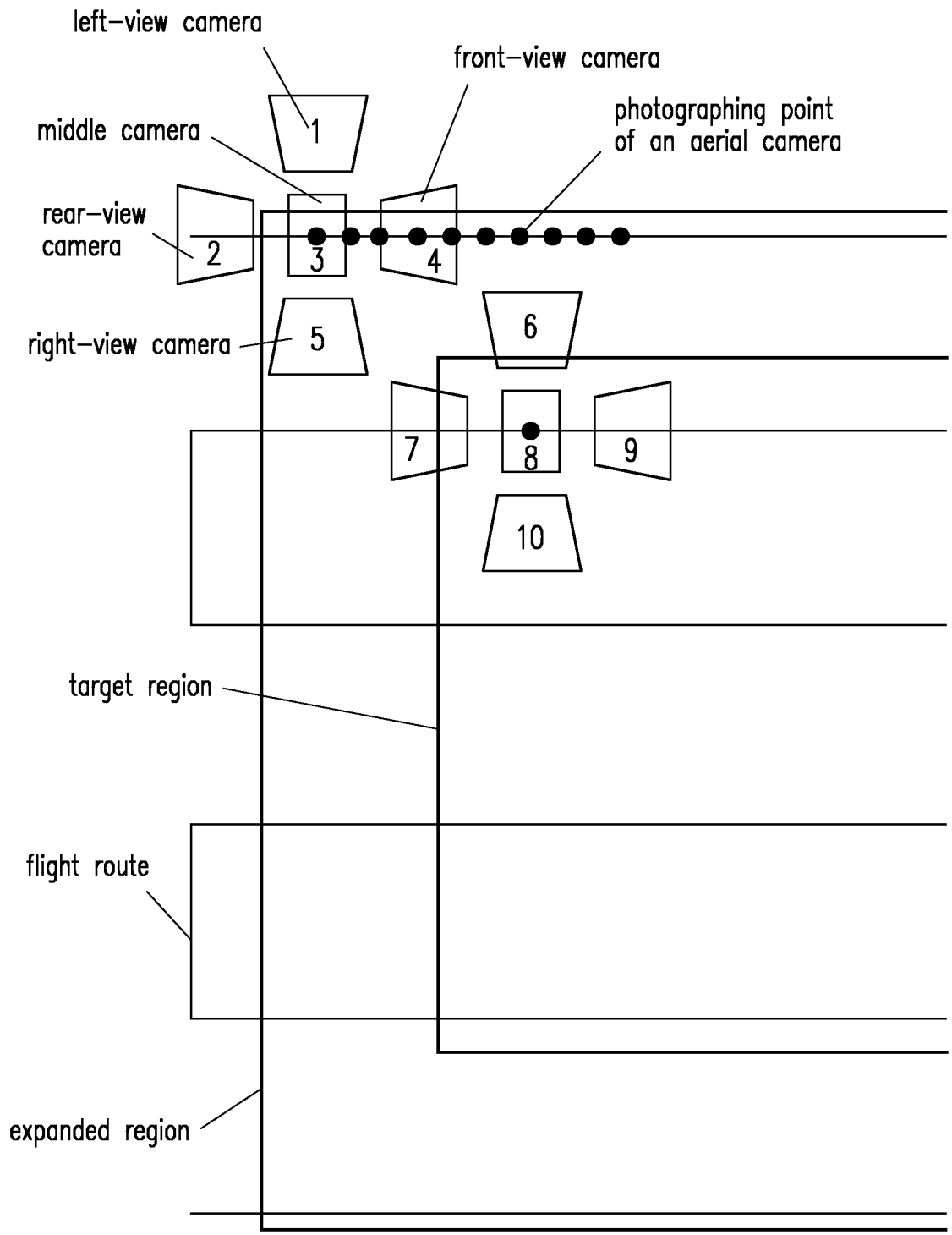
FIG. 1 is a schematic diagram of an aerial survey method capable of eliminating redundant aerial photos according to the present application.
Figure 2:
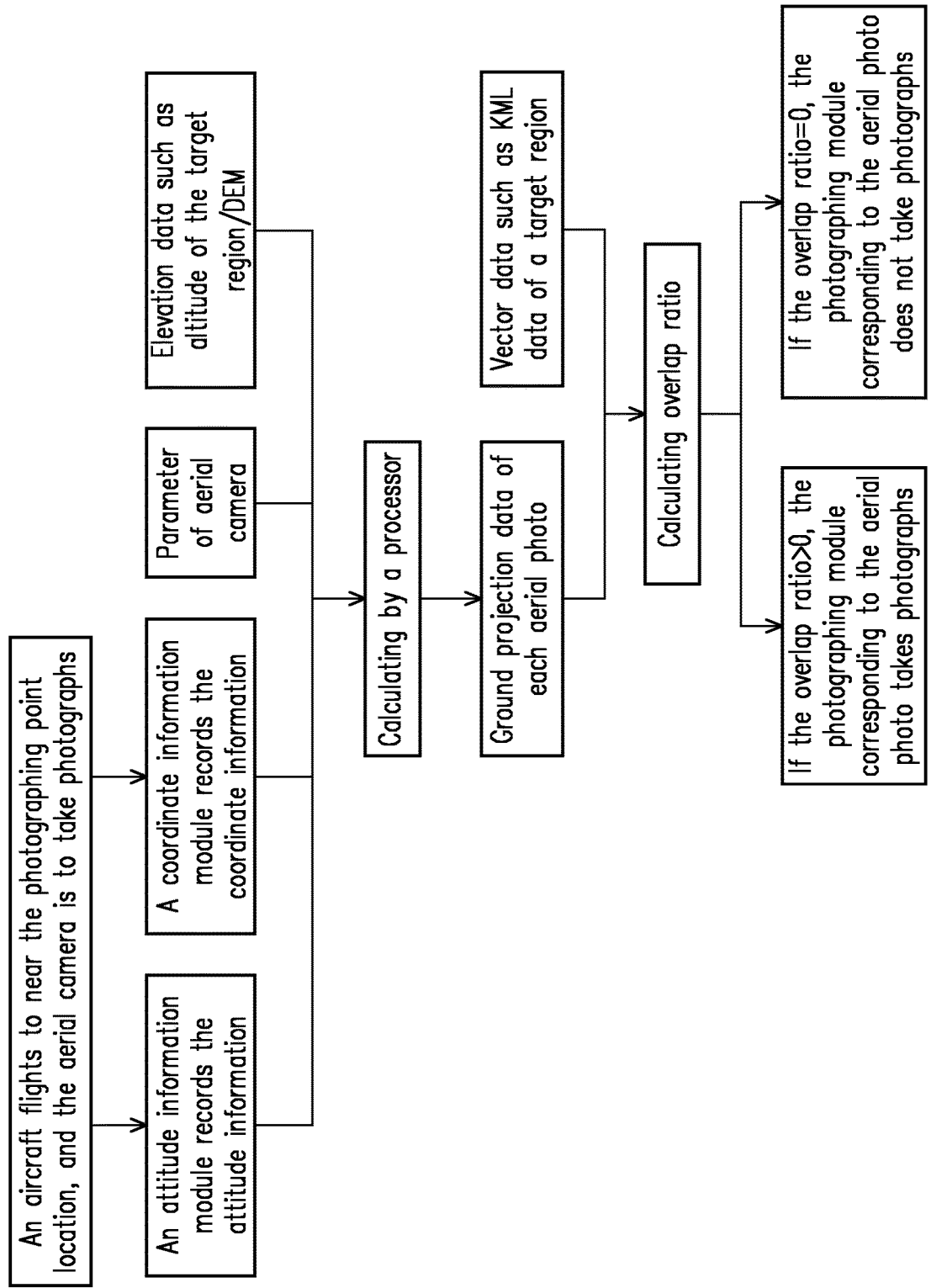
FIG. 2 is a flow chart of an aerial survey method capable of eliminating redundant aerial photos according to an embodiment of the present application, in which whether to perform aerial photography at a photographing coordinate point or not is determined according to the overlap ratio.
Figure 3:
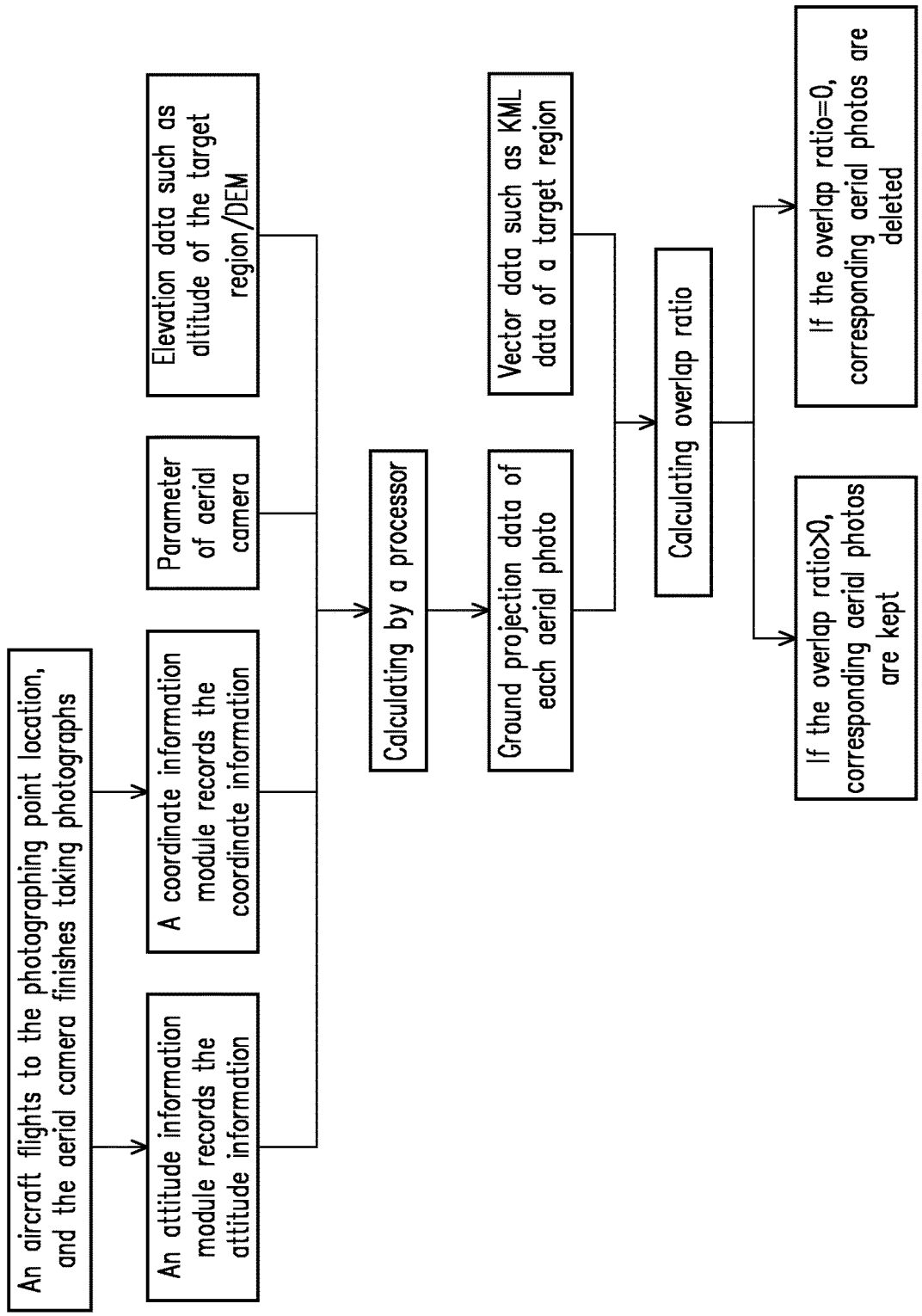
FIG. 3 is a flow chart of an aerial survey method capable of eliminating redundant aerial photos according to an embodiment of the present application, in which whether to store the aerial photos data obtained at the photographing coordinate point or not is determined according to the overlap ratio.

As shown in FIGS. 1-3, an aerial survey method capable of eliminating redundant aerial photos includes the following steps in order:

S1, according to coordinate information and attitude information of an aircraft or an aerial camera at a photographing coordinate point, parameter information of the aerial camera and regional geographic information of a target region, obtaining ground projection data of the aerial photos on the photographing coordinate point;

S2, comparing the ground projection data obtained in S1 with known data of the target region, and if there is an intersection between the two data, obtaining the aerial photography data of the photographing coordinate point, and if there is not an intersection between the two data, eliminating the aerial photography data of the photographing coordinate point or not performing aerial photography at the photographing coordinate point.

In the existing technologies, although the overlap ratio of aerial photos in the aerial survey target region is considered and solved, in the aerial photography process, the aerial camera will capture a lot of aerial photo data that has nothing to do with the target region, which not only occupies the storage capacity of the aerial camera, but also increases the burden on post-data processing, that is, not only increases the hardware cost of the aerial camera, but also increases the input cost of data processing module or apparatus, and increases the cost of data processing time, and so on.

In the present application, for specific parameters of the aircraft and of the aerial camera at the photographing coordinate point, and the regional geographic information of the target region where the photographing coordinate point is located, the relationship of the ground projection data obtained by the aerial camera at the photographing coordinate point and the known data of the target region is firstly determined, so as to choose whether to store the aerial photography data of the photographing coordinate point. In this way, useless aerial photography data can be effectively eliminated, thereby reducing the amount of useless aerial photos and achieving the purpose of reducing the amount of data storage and the amount of data processing during the aerial survey operation, and improving the efficiency of data processing.

As a person skilled in the art, when implementing the storing of the aerial photography data of the photographing coordinate point or the eliminating of the aerial photography data of the photographing coordinate point described above, the storing includes performing aerial photography at the photographing coordinate point and then storing the obtained aerial photography data; and the eliminating is any one of the following manners: 1. when it is determined that the overlapping requirement is not met before performing aerial photography at the photographing coordinate point, aerial photography at the photographing coordinate point is not performed, that is, aerial photography at the photographing coordinate point is not performed during the entire process; and 2. when the overlapping requirement is not met after performing aerial photography at the photographing coordinate point, the obtained data is deleted.

In order to better explain this embodiment, FIG. 1 shows a schematic diagram of the aerial survey method. The schematic diagram is based on the aerial camera carried with five camera heads (cameras). In the figure, the ground projection of the camera is the photographing coverage region of individual camera heads (camera), and a situation of the photographing coverage region of two photographing coordinate points is also given. In this figure, the overlap ratio between the aerial photos 1, 2, 3, 4 and 5 and the target region is equal to 0, that is, a case of no overlap (no intersection). The overlap ratio between the aerial photos 6, 7, 8, 9 and 10 and the target region is larger than 0, that is, a situation of overlap (intersection).

FIG. 2 shows an implementation flowchart using the above mentioned first elimination manner. More specifically, the aerial camera or the aircraft is equipped with an IMU, a PPK (GPS) module and a processor module that can obtain and process information in real time. According to the information obtained by the above modules and known information (including the aerial camera geometric parameter, optical parameter, the lowest altitude of the target region/target region DEM), the ground projection data of each aerial photo to be taken can be obtained, and calculated with the known data (KML, SHP and other vector data of the target region). If the overlap ratio>0, there is an intersection between aerial photos and the target region, and it is fed back to the corresponding camera in the aerial camera to take photographs, otherwise, no photographs are taken.

FIG. 3 shows an implementation flowchart using the above second manner of elimination. Specifically, the aerial camera or the aircraft is equipped with an IMU, a PPK (GPS) module and a processor module that can obtain and process information in real time. During the flight of the aircraft flying to the camera point B after taking photographs at the camera point A, the ground projection data at point A of each of the aerial photos to be taken can be obtained according to the information obtained by the above modules and known information (including the aerial camera geometric parameter, optical parameter, the lowest altitude of the target region/target region DEM), and calculated with the known data (KML, SHP and other vector data of the target region). If the overlap ratio>0, the aerial photos are kept, and if the overlap ratio=0, the aerial photos are deleted.

By using the solution provided in this embodiment, the number of useless aerial photos can be greatly reduced to 0.

Embodiment 2

This embodiment is further defined on the basis of embodiment 1. As shown in FIG. 2, specifically, in step S2, if it is determined that there is an intersection between the two data, aerial photography is performed at the photographing coordinate point to obtain the aerial photography data, and if it is determined that there is no intersection, aerial photography is not performed at the photographing coordinate point. The present embodiment is to feed back the aerial camera whether to take photographs based on calculation: when it is determined that the two data do not meet the overlapping requirement before performing aerial photography at the photographing coordinate point, aerial photography is not performed at the photographing coordinate point, that is, there is no aerial photography at the photographing coordinate point during the whole process. As a person skilled in the art, when implementing the present embodiment, the above process may be executed after the aircraft reaches the photographing coordinate point, or the determination is carried out before the aircraft reaches the photographing coordinate point. In view of the above situation, the coordinate information and attitude information of the aircraft or the aerial camera at the actual photographing point may be equal to the coordinate information and attitude information of the aircraft or the aerial camera at the photographing coordinate point, since the time required to calculate the overlap is very short and the actual photographing point is very close to the photographing coordinate point. In the situation of not reaching the photographing coordinate point, since the regional geographic information of the target region is fixed, and the parameter information of the aerial camera carried is set, it is needed to prejudge the attitude information of the aircraft or the aerial camera at the photographing coordinate point, in which the prejudgment can be completed according to the parameter information of the aircraft and the weather condition information of the flight region. Based on the prejudgment, the utilization efficiency of the aircraft can be maximized.

Embodiment 3

This embodiment is further defined on the basis of embodiment 1. As shown in FIG. 3, specifically, aerial photography is performed at the photographing coordinate point, and in step S2, if it is determined that there is an intersection between the two data, the aerial photography data is kept, and if it is determined that there is no intersection between the two data, the aerial photography data is deleted. Regarding the eliminating, the situation is that, after performing aerial photography at the photographing coordinate point, when it is determined that the two data do not meet the overlapping requirement, the obtained data is then deleted. Regarding the previous situation in which the aerial photography data of the photographing coordinate point is stored, although the ground projection data calculation (overlap ratio determination) requires a very short time due to the performance of the existing processor, errors will arise in this situation, since the aircraft is in flight and the coordinate and attitude information of the aircraft when the aerial camera actually takes photographs have changed. In contrast, the manner adopted by the present embodiment can obtain more accurate aerial photography data.

Embodiment 4

This embodiment is further defined on the basis of embodiment 1. The photographing coordinate point is a point in space determined by longitude, latitude and altitude data.

The attitude information includes angular velocity information and acceleration information.

The coordinate information includes longitude, latitude and altitude information.

The parameter information includes geometric parameter information and optical parameter information of the aerial camera.

The regional geographic information is altitude information of the target region or elevation data such as DEM information of the target region.

The known data of a target region is vector data such as KML data or SHP data.

Embodiment 5

This embodiment is further defined on the basis of embodiment 1. In order to improve the quality of the aerial photography data or expand the coverage range of the aerial photography data obtained by the photographing coordinate point, the aerial camera includes a plurality of photographing modules.

The different photographing modules cover different photographing regions. This embodiment relates to a situation of expanding the coverage range of the aerial photography data obtained by the photographing coordinate point.

In order to enable individual photographing modules in the aerial camera to work independently, it is provided that in the aerial camera, each of the photographing modules is connected with an independent control module. With this solution, the control module is used to control the corresponding photographing module whether to work or not, or/and whether to keep the aerial photography data obtained or not.

Embodiment 6

This embodiment is further defined on the basis of embodiment 1. In order to provide the aircraft with a hovering function or a low-speed flight performance for taking photographs when hovering at the photographing coordinate point or taking photographs during a low-speed flight, it is provided that the aircraft is a multi-rotor type aircraft or a composite rotor type aircraft, so as to facilitate improving the accuracy of the aerial photography data and the quality of aerial photography.

Embodiment 7

Figure 4:
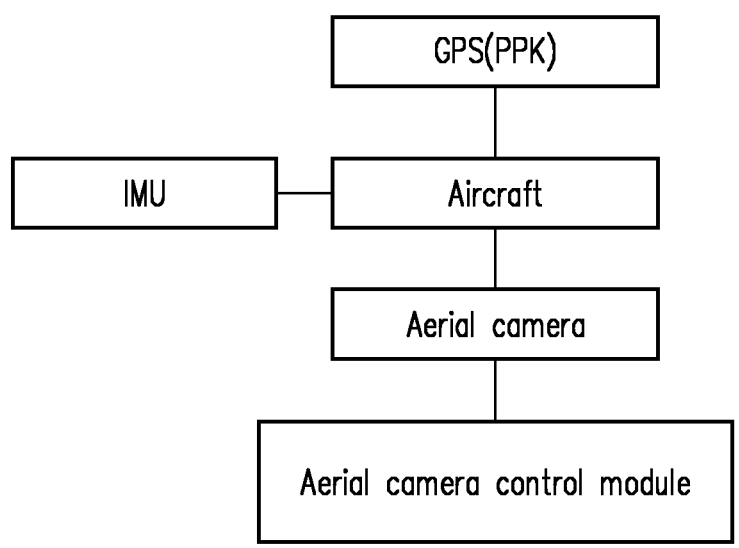
FIG. 4 is a structural topology diagram of an example of an aerial survey apparatus capable of eliminating redundant aerial photos according to an embodiment of the present application.

The present embodiment provides an apparatus for implementing the above method. As shown in FIG. 4, an aerial survey apparatus capable of eliminating redundant aerial photos includes an aircraft and an aerial camera carried on the aircraft. It includes an attitude information module and a coordinate information module carried on the aircraft or the aerial camera, in which the attitude information module is configured for acquiring the attitude information of the aircraft or the aerial camera, and the coordinate information module is configured for acquiring the coordinate information of the aircraft or the aerial camera.

It further includes an aerial camera control module carried on the aircraft or the aerial camera for controlling the aerial camera. The control manner of the aerial camera control module is any one of the following manners: 1. controlling the aerial camera whether to take photographs or not; and 2. controlling the aerial camera whether to delete the taken data or not. This apparatus is used as a hardware support of the method for implementing the method, so as to achieve the purpose of reducing the amount of data to be processed in the process of aerial survey operations and improving the efficiency of data processing. For a person skilled in the art, regarding the parameter information, the existing aerial camera generally has fixed parameter information, and in specific applications, the parameter information of the aerial camera can be directly obtained.

The aerial camera control module is configured to control the aerial camera whether to take photographs or not.

The aerial camera control module is configured to control the aerial camera whether to delete the taken data or not.

The working parameter of the aerial camera includes geometric parameters and optical parameters.

The aerial camera includes a plurality of photographing modules.

Different photographing modules cover different photographing regions.

Each of the individual photographing modules is connected with an independent control module.

The aircraft is a multi-rotor type aircraft or a composite rotor type aircraft.

The attitude information includes angular velocity information and acceleration information of the aircraft or the aerial camera, and the coordinate information includes data of longitude, latitude and altitude where the aircraft or the aerial camera is located.

The above content is a further detailed description of the present application in conjunction with specific preferred embodiments, and it cannot be considered that the specific embodiments of the present application are limited to these descriptions. For those of ordinary skill in the technical field of the present application, other implementations derived from the technical solution of the present application should all be included in the scope of protection of the present application.

What is claimed is:

1. An aerial survey method capable of eliminating redundant aerial photos, comprising judging whether there is an intersection between ground projection data of aerial photos at a photographing coordinate point and known data of a target region, and when there is an intersection between the ground projection data and the known data, keeping aerial photography data of the photographing coordinate point or performing aerial photography at the photographing coordinate point, and when there is no intersection between the ground projection data and the known data, eliminating the aerial photography data of the photographing coordinate point or not performing the aerial photography at the photographing coordinate point, wherein the ground projection data of the aerial photos at the photographing coordinate point is obtained according to coordinate information and attitude information of an aircraft or an aerial camera at the photographing coordinate point, and parameter information of the aerial camera, and wherein the photographing coordinate point is a point in space determined by longitude, latitude and altitude data; the attitude information comprises angular velocity information and acceleration information; the coordinate information comprises longitude, latitude and altitude information; the parameter information comprises geometric parameter information and optical parameter information of the aerial camera; and the known data of the target region is a vector data, comprising keyhole markup language (KML) data or shapefile (SHP) data.

2. The aerial survey method capable of eliminating redundant aerial photos according to claim 1, wherein the aerial camera comprises a plurality of photographing modules.

3. The aerial survey method capable of eliminating redundant aerial photos according to claim 2, wherein the plurality of photographing modules cover different photographing regions.

4. The aerial survey method capable of eliminating redundant aerial photos according to claim 2, wherein each of the plurality of photographing modules is connected with an independent control module.

5. An aerial survey apparatus capable of eliminating redundant aerial photos, comprising a judging module and an aerial camera control module; wherein the judging module is configured to judge whether there is an intersection between ground projection data of aerial photos at a photographing coordinate point and known data of a target region; and the aerial camera control module is configured to keep aerial photography data of the photographing coordinate point or perform aerial photography at the photographing coordinate point when there is an intersection between the ground projection data and the known data, and eliminate the aerial photography data of the photographing coordinate point or not perform the aerial photography at the photographing coordinate point when there is no intersection between the ground projection data and the known data, wherein the ground projection data of the aerial photos at the photographing coordinate point is obtained according to coordinate information and attitude information of an aircraft or an aerial camera at the photographing coordinate point, and parameter information of the aerial camera, and wherein the photographing coordinate point is a point in space determined by longitude, latitude and altitude data; the attitude information comprises angular velocity information and acceleration information; the coordinate information comprises longitude, latitude and altitude information; the parameter information comprises geometric parameter information and optical parameter information of the aerial camera; and the known data of the target region is a vector data, comprising keyhole markup language (KML) data or shapefile (SHP) data.

6. The aerial survey apparatus capable of eliminating redundant aerial photos according to claim 5, wherein the aerial camera comprises a plurality of photographing modules.

* * * * *